United States Patent
Xia et al.

(10) Patent No.: US 10,601,560 B2
(45) Date of Patent: Mar. 24, 2020

(54) METHODS AND DEVICES FOR TRANSMITTING NARROW BAND ORTHOGONAL FREQUENCY DIVISION MULTIPLEXING SIGNALS

(71) Applicant: ZTE CORPORATION, Guangdong (CN)

(72) Inventors: Shuqiang Xia, Guangdong (CN); Bo Dai, Guangdong (CN); Wen Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/756,526

(22) PCT Filed: Dec. 8, 2016

(86) PCT No.: PCT/CN2016/094963
§ 371 (c)(1),
(2) Date: Feb. 28, 2018

(87) PCT Pub. No.: WO2017/036296
PCT Pub. Date: Mar. 9, 2017

(65) Prior Publication Data
US 2018/0270031 A1      Sep. 20, 2018

(30) Foreign Application Priority Data
Sep. 6, 2015   (CN) .......................... 2015 1 0559636

(51) Int. Cl.
*H04W 4/44*     (2018.01)
*H04W 4/90*     (2018.01)
(Continued)

(52) U.S. Cl.
CPC ............. *H04L 5/0048* (2013.01); *H04W 4/70* (2018.02); *H04W 16/14* (2013.01); *H04W 72/044* (2013.01); *H04W 72/0493* (2013.01)

(58) Field of Classification Search
CPC ............ H04L 5/0048; H04W 72/0493; H04W 72/044; H04W 4/70; H04W 16/14
(Continued)

(56) References Cited

U.S. PATENT DOCUMENTS

| 7,047,006 B2 | 5/2006 | Classon et al. |
| 2005/0245258 A1 | 11/2005 | Classon et al. |

(Continued)

FOREIGN PATENT DOCUMENTS

| CN | 1926842 A | 3/2007 |
| EP | 2978152 A1 | 1/2016 |

(Continued)

OTHER PUBLICATIONS

International Search Report issued Nov. 3, 2016, in corresponding International Application No. PCT/CN2016/094963.
Extended European Search Report dated Oct. 8, 2018, in corresponding European Application No. 16840725.2.
(Continued)

*Primary Examiner* — Marcus Smith
*Assistant Examiner* — Mohammed S Chowdhury
(74) *Attorney, Agent, or Firm* — Duane Morris LLP (57) ABSTRACT

A method of transmitting a narrow-band orthogonal frequency division multiplexing signal, comprising: determining a spectrum resource of a narrow-band orthogonal frequency division multiplexing system in a bandwidth of a long-term evolution (LTE) system sharing the bandwidth with the narrow-band orthogonal frequency division multiplexing system according to a resource selection strategy; and transmitting the narrow-band orthogonal frequency
(Continued)

division multiplexing signal on the determined spectrum resource of the narrow-band orthogonal frequency division multiplexing system. The solution enables transmission of a narrow-band orthogonal frequency division multiplexing signal in a bandwidth of an LTE system, thus facilitating signal detection and cost reduction of a terminal served by the barrow-band orthogonal frequency division multiplexing system, and also reducing interference between the LTE system and the narrow-band orthogonal frequency division multiplexing system.

24 Claims, 1 Drawing Sheet

(51) Int. Cl.
    *H04W 48/18*     (2009.01)
    *H04L 29/08*     (2006.01)
    *H04L 5/00*     (2006.01)
    *H04W 16/14*     (2009.01)
    *H04W 4/70*     (2018.01)
    *H04W 72/04*     (2009.01)

(58) Field of Classification Search
    USPC ........................................................ 370/330
    See application file for complete search history.

(56) References Cited

U.S. PATENT DOCUMENTS

| | | | |
|---|---|---|---|
| 2013/0064119 A1* | 3/2013 | Montojo | H04W 36/0061 |
| | | | 370/252 |
| 2013/0208664 A1 | 8/2013 | Viswanathan | |
| 2015/0036609 A1 | 2/2015 | Kim et al. | |
| 2016/0081033 A1 | 3/2016 | Ouchi et al. | |
| 2017/0290016 A1* | 10/2017 | Yi | H04W 72/042 |
| 2018/0062699 A1* | 3/2018 | Horiuchi | H04L 5/0053 |

FOREIGN PATENT DOCUMENTS

| | | |
|---|---|---|
| JP | 2014-222904 A | 11/2014 |
| WO | 2010/151217 A2 | 12/2010 |
| WO | 2011072884 A1 | 6/2011 |
| WO | 2013173673 A2 | 11/2013 |
| WO | 2014/181836 A1 | 11/2014 |
| WO | 2014/200279 A1 | 12/2014 |
| WO | 2015-026604 A1 | 2/2015 |
| WO | 2017/017880 A1 | 2/2017 |

OTHER PUBLICATIONS

Official Action dated May 21, 2019, in corresponding Japanese Patent Application No. 2018-512184.

* cited by examiner

METHODS AND DEVICES FOR TRANSMITTING NARROW BAND ORTHOGONAL FREQUENCY DIVISION MULTIPLEXING SIGNALS

TECHNICAL FIELD

The present disclosure relates to but is not limited to wireless communications and, in particular, relates to methods and devices for transmitting narrow band orthogonal frequency division multiplexing signals.

BACKGROUND

User Equipment or tell (UE) of Machine Type Communication (MTC), also called Machine to Machine (M2M) user communication device, is the current major application type of the Internet of Things. In the technical report TR45.820V200 of the 3rd Generation Partnership Project (3GPP), several technologies that are applicable to Cellular Internet of Things (C-IOT) are published; among them, the technology of Narrow Band Long Term Evolution (NB-LTE) attracts the most attention. The bandwidth of NB-LTE system is 200 kHz, the same as the channel bandwidth of Global System for Mobile Communication (GSM). This brings great convenience for GSM frequency spectrum being reused on NB-LTE system as well as reducing mutual interference with nearby GSM channels. Besides, the emission bandwidth of NB-LTE system and the interval of downlink subcarrier are 180 kHz and 15 kHz respectively, which are respectively the same as the bandwidth and subcarrier spacing of a Physical Resource Block (PRB) on LTE system. Therefore, it is favorable for the relevant design of reusing related LTE system on NB-LTE. It is also good for reducing the mutual interference between the two systems when the reused GSM frequency spectrum on NB-LTE is next to the frequency spectrum of LTE system.

Moreover, LTE system supports the following 6 system bandwidths: 1.4 MHz, 3 MHz, 5 MHz, 10 MHz, 15 MHz and 20 MHz, and these 6 bandwidths have respectively 72, 150, 300, 600, 900, and 1200 subcarriers available. Considering that the emission bandwidth of NB-LTE system and the interval of downlink subcarrier are respectively the same as the bandwidth and subcarrier spacing of a PRB on LTE system, it is possible that NB-LTE and LTE are existed on the same portion of frequency spectrum; for example, allocating a 180 kHz bandwidth used for NB-LTE signal emission on LTE system of 20 MHz bandwidth. However, the related technologies of how to transmit critical signals of; e.g. synchronization signal, pilot signal, and etc., on NB-LTE in order to achieve signal detection and cost reduction for the terminal of NB-LTE system service as well as reduce the mutual interference between the two systems still lack of effective solutions due to the terminal differences between NB-LTE and LTE systems.

SUMMARY

The following is a summary of the subject matters that are detailed described in the present disclosure. The summary is not intended to limit the protection scope of claims.

The embodiments of present disclosure provide methods and devices for transmitting narrow band orthogonal frequency division multiplexing signals, which enable transmitting narrow band orthogonal frequency division multiplexing in the bandwidth of LTE system, further achieve the convenience of signal detection and cost reduction for the terminal of narrow band orthogonal frequency division multiplexing system service as well as reduce the mutual interference between LTE and narrow band orthogonal frequency division multiplexing systems.

The embodiments of present disclosure provide a method for transmitting a narrow band orthogonal frequency division multiplexing signal, comprising determining a spectrum resource of the narrow band orthogonal frequency division multiplexing system in a LTE system bandwidth according to a resource selection strategy, wherein the LTE system and the narrow band orthogonal division multiplexing system share bandwidth, and transmitting a narrow band orthogonal frequency division multiplexing signal on the determined spectrum resource of the narrow band orthogonal frequency division multiplexing system.

The embodiments of present disclosure also provide a device for a transmitting a narrow band orthogonal frequency division multiplexing signal, comprising a spectrum resource determination block, configured to determine a spectrum resource of a narrow band orthogonal frequency division multiplexing system in a LTE system bandwidth according to a resource selection strategy, wherein the LTE system and the narrow band orthogonal division multiplexing system share bandwidth, and a transmission block configured to transmit a narrow band orthogonal frequency division multiplexing signal on the determined spectrum resource of the narrow band orthogonal frequency division multiplexing system.

The embodiments of present disclosure further provide a computer readable storage medium which stores computer executable instructions thereon. The computer executable instructions, when executed, carry out the method for transmitting a narrow band orthogonal frequency division multiplexing signal.

In the embodiments of present disclosure, the spectrum resource of the narrow band orthogonal frequency division multiplexing system are determined in a LTE bandwidth shared with the narrow band orthogonal frequency division multiplexing system according to the resource selection strategy, and the narrow band orthogonal frequency division multiplexing signal is transmitted on the determined spectrum resource of the narrow band orthogonal frequency division multiplexing system. In this way, transmission of a narrow band orthogonal frequency division multiplexing signal in the bandwidth of a LTE system is implemented and further achieves the convenience of signal detection and cost reduction for the terminal of narrow band orthogonal frequency division multiplexing system service as well as reduces the mutual interference between LTE and narrow band orthogonal frequency division multiplexing systems.

In the embodiments of present disclosure, when a narrow band orthogonal frequency division multiplexing system utilizes a resource in a LTE system bandwidth, a terminal of narrow band orthogonal frequency division multiplexing system can conduct rapid detection on the synchronization signal transmitted from a base station. The speed of terminal accessing system is enhanced without extra hardware costs and power consumption; furthermore, a reference signal of narrow band orthogonal frequency division multiplexing system can be used for a conventional LTE system terminal in the circumstance of being used for a narrow band orthogonal frequency division multiplexing system terminal at the same time without any signaling costs. While the utilization efficiency of reference signal is enhanced, the result of costs saving is achieved. In addition, the reference signal is not transmitted on the center subcarrier of narrow band orthogonal frequency division multiplexing system according to the embodiments of present disclosure; the performance of LTE system terminal modulation is thus enhanced.

Other relevant aspects can be understood after reading and comprehending the attached drawings and detailed description.

DETAILED DESCRIPTION

A detailed description of some embodiments is presented with drawings as below. It should be understood that the embodiments described in the following are only used to demonstrate and explain the application but not to limit it.

Figure 1:
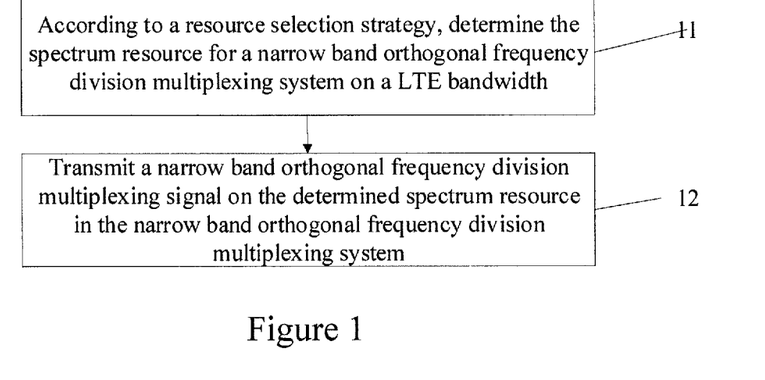
FIG. 1 shows a flow chart of a method for transmitting narrow band orthogonal frequency division multiplexing signals according to some embodiments of the present disclosure.

FIG. 1 shows a flow chart of a method for transmitting narrow band orthogonal frequency division multiplexing signals according to the embodiments of the present disclosure. As shown on FIG. 1, the method for transmitting narrow band orthogonal frequency division multiplexing signals provided in an embodiment includes the following procedure:

Step 11: According to a resource selection strategy, the spectrum resource for a narrow band orthogonal frequency division multiplexing system is determined on a LTE bandwidth, wherein the LTE system shares bandwidth with the narrow band orthogonal frequency division multiplexing system.

The subcarrier spacing of narrow band orthogonal frequency division multiplexing signal here is 15 kHz, the same as that on LTE system.

In which, set cell identity of LTE system as $N_{ID}^{cell}$ and $N_{BW}$ subcarriers are available in a LTE system bandwidth; accordingly, the bandwidth includes $N_{PRB}$ pieces of Physical Resource Block (PRB) as well as $$N_{PRB} = \frac{N_{BW}}{12}.$$

The subcarrier index is $0, 1, 2, \ldots, N_{BW}-1$ while PRB index is $0, 1, 2, \ldots, N_{PRB}-1$; both $N_{BW}$ and $N_{PRB}$ are integers greater than zero. The bandwidth of narrow band orthogonal frequency division multiplexing system includes $M_{BW}$ subcarriers and $M_{BW}$ is integer greater than 3. The said $M_{BW}$ subcarriers use a certain subcarrier as the center according to the corresponding frequencies, and the subcarrier is called a center subcarrier. When $M_{BW}$ is an odd number, the number of the subcarrier on both sides of the center subcarrier is equal; while $M_{BW}$ is an even number, the number difference between the subcarriers on both sides of the center subcarrier is 1. The PRB index in LTE bandwidth of the center subcarrier among $M_{BW}$ subcarriers in narrow band orthogonal frequency division multiplexing system is $I_{PRB}$ and the carrier index of the said center subcarrier in PRB is $I_{SC}$; $I_{PRB}$ and $I_{SC}$ are integers greater than or equal to zero.

In one embodiment, the resource selection strategy includes:

When $N_{BW}$ mod 24 0, $I_{PRB}$ and $I_{SC}$ satisfy one of the followings:

While $I_{PRB}$ mod 5 0 and $I_{PRB}$ is not equal to zero and less than $N_{PRB}/2$, then $I_{SC}$ 0;

While $I_{PRB}$ mod 5 1, $I_{PRB}$ is less than $N_{PRB}/2$, then $I_{SC}$ 8; if $I_{PRB}$ is greater than $N_{PRB}/2$, then $I_{SC}$ 7;

While $I_{PRB}$ mod 5 3, $I_{PRB}$ is less than $N_{PRB}/2$, then $I_{SC}$ 4; if $I_{PRB}$ is greater than $N_{PRB}/2$, then $I_{SC}$ 3;

While $I_{PRB}$ mod 5 4 and $I_{PRB}$ is greater than $N_{PRB}/2$, then $I_{SC}$ 11;

In above, mod represents modular arithmetic.

Meanwhile, $M_{BW}$ subcarriers in the narrow band orthogonal frequency division multiplexing system are not overlapped with the 72 subcarriers in LTE system when $N_{BW}$ is greater than 72.

In one embodiment, the resource selection strategy includes:

When $N_{BW}$ mod 24 12, $I_{PRB}$ and $I_{SC}$ satisfy one of the followings:

While $I_{PRB}$ mod 5 0 and $I_{PRB}$ is less than $$\left\lfloor \frac{N_{PRB}}{2} \right\rfloor,$$

$I_{SC}$ 10; if $I_{PRB}$ is greater than $$\left\lfloor \frac{N_{PRB}}{2} \right\rfloor,$$

then $I_{SC}$ 9;

While $I_{PRB}$ mod 5 2 and $I_{PRB}$ is less than $$\frac{N_{PRB}}{2},$$

$I_{SC}$ 6; if $I_{PRB}$ is greater than $$\left\lfloor \frac{N_{PRB}}{2} \right\rfloor,$$

then $I_{SC}$ 5;

While $I_{PRB}$ mod 5 4 and $I_{PRB}$ is less than $$\left\lfloor \frac{N_{PRB}}{2} \right\rfloor,$$

$I_{SC}$ 2; if $I_{PRB}$ is greater than $$\frac{N_{PRB}}{2},$$

then $I_{SC}$ 1;

In above, mod is modular arithmetic and represents floor function.

Meanwhile, $M_{BW}$ subcarriers in the narrow band orthogonal frequency division multiplexing system are not overlapped with the 72 subcarriers in LTE system when $N_{BW}$ is greater than 72.

In one embodiment, the resource selection strategy includes:

When $N_{ID}^{cell}$ mod 3=0 and $N_{BW}$ mod 24 0, $I_{PRB}$ and $I_{SC}$ satisfy one of the followings:

While $I_{PRB}$ mod 5 1 and $I_{PRB}$ is less than $N_{PRB}/2$, $I_{SC}$ 8; if $I_{PRB}$ is greater than $N_{PRB}/2$, then $I_{SC}$ 7;

While $I_{PRB}$ mod 5 3 and $I_{PRB}$ is less than $N_{PRB}/2$, $I_{SC}$ 4;

While $I_{PRB}$ mod 5 4 and $I_{PRB}$ is greater than $N_{PRB}/2$, $I_{SC}$ 11;

In above, mod represents modular arithmetic.

In one embodiment, the resource selection strategy includes:

While $N_{ID}^{cell}$ mod 3=0 and $N_{BW}$ mod 24 12, $I_{PRB}$ and $I_{SC}$ satisfy one of the followings:

While $I_{PRB}$ mod 5 0 and $I_{PRB}$ is less than $$\frac{N_{PRB}}{2},$$

$I_{SC}$ 10;

While $I_{PRB}$ mod 5 2 and $I_{PRB}$ is greater than $$\left\lfloor \frac{N_{PRB}}{2} \right\rfloor,$$

$I_{SC}$ 5;

While $I_{PRB}$ mod 5 4 and $I_{PRB}$ is less than $$\left\lfloor \frac{N_{PRB}}{2} \right\rfloor,$$

$I_{SC}$ 2; if $I_{PRB}$ is greater than $$\left\lfloor \frac{N_{PRB}}{2} \right\rfloor,$$

then $I_{SC}$ 1;

In above, mod is modular arithmetic and represents floor function.

In one embodiment, the resource selection strategy includes:

When $N_{ID}^{cell}$ mod 3=1 and $N_{BW}$ mod 24 0, $I_{PRB}$ and $I_{SC}$ satisfy one of the followings:

While $I_{PRB}$ mod 5 0 and $I_{PRB}$ is not equal to zero and $I_{PRB}$ is less than $N_{PRB}/2$, $I_{SC}$ 0;

While $I_{PRB}$ mod 5 1 and $I_{PRB}$ is less than $N_{PRB}/2$, $I_{SC}$ 8;

While $I_{PRB}$ mod 5 3 and $I_{PRB}$ is greater than $N_{PRB}/2$, $I_{SC}$ 3;

While $I_{PRB}$ mod 5 4 and $I_{PRB}$ is greater than $N_{PRB}/2$, $I_{SC}$ 11;

In above, mod represents modular arithmetic.

In one embodiment, the resource selection strategy includes:

When $N_{ID}^{cell}$ mod 3=1 and $N_{BW}$ mod 24 12, $I_{PRB}$ and $I_{SC}$ satisfy one of the followings:

While $I_{PRB}$ mod 5 0 and $I_{PRB}$ is less than $$\left\lfloor \frac{N_{PRB}}{2} \right\rfloor,$$

$I_{SC}$ 9;

While $I_{PRB}$ mod 5 2 and $I_{PRB}$ is less than $$\left\lfloor \frac{N_{PRB}}{2} \right\rfloor,$$

$I_{SC}$ 6; if $I_{PRB}$ is greater than $$\frac{N_{PRB}}{2},$$

then $I_{SC}$ 5;

While $I_{PRB}$ mod 5 4 and $I_{PRB}$ is less than $$\left\lfloor \frac{N_{PRB}}{2} \right\rfloor,$$

$I_{SC}$ 2;

In above, mod is modular arithmetic and $\lfloor \ \rfloor$ represents floor function.

In one embodiment, the resource selection strategy includes:

When $N_{ID}^{cell}$ mod 3 2 and $N_{BW}$ mod 24 0, $I_{PRB}$ and $I_{SC}$ satisfy one of the followings:

While $I_{PRB}$ mod 5 0 and $I_{PRB}$ is not equal to zero and $I_{PRB}$ is less than $N_{PRB}/2$, $I_{SC}$ 0;

While $I_{PRB}$ mod 5 1 and $I_{PRB}$ is less than $N_{PRB}/2$, $I_{SC}$ 7;

While $I_{PRB}$ mod 5 3 and $I_{PRB}$ is greater than $N_{PRB}/2$, $I_{SC}$ 4; if $I_{PRB}$ is greater than $N_{PRB}/2$, then $I_{SC}$ 3;

While $I_{PRB}$ mod 5 4 and $I_{PRB}$ is greater than $N_{PRB}/2$, $I_{SC}$ 11;

In above, mod represents modular arithmetic.

In one embodiment, the resource selection strategy includes:

When $N_{ID}^{cell}$ mod 3=2 and $N_{BW}$ mod 24 12, $I_{PRB}$ and $I_{SC}$ satisfy one of the followings:

While $I_{PRB}$ mod 5 0 and $I_{PRB}$ is greater than $$\frac{N_{PRB}}{2},$$

$I_{SC}$ 9;

While $I_{PRB}$ mod 5 2 and $I_{PRB}$ is less than $$\left\lfloor \frac{N_{PRB}}{2} \right\rfloor,$$

$I_{SC}$ 6;

While $I_{PRB}$ mod 5 4 and $I_{PRB}$ is greater than $$\left\lfloor \frac{N_{PRB}}{2} \right\rfloor,$$

$I_{SC}$ 1;

In above, mod is modular arithmetic and represents floor function.

Step 12: transmit a narrow band orthogonal frequency division multiplexing signal on the determined spectrum resource in the narrow band orthogonal frequency division multiplexing system.

In one embodiment, step 12 includes transmitting a synchronization signal on one or more subcarriers in the narrow band orthogonal frequency division multiplexing system. Among them, in different Orthogonal Frequency Division Multiplexing (OFDM) symbols, the synchronization signal occupies different subcarriers.

For above, the synchronization signal carries at least one of the following information:

cell identity information of the narrow band orthogonal frequency division multiplexing system; in which, the carried cell identity information in narrow band orthogonal frequency division multiplexing system is the same as that in LTE system when the synchronization signal carries the cell identity information of the narrow band orthogonal frequency division multiplexing system.

the frequency domain position of the narrow band orthogonal frequency division multiplexing system in the LTE system, such as the center subcarrier of narrow band orthogonal frequency division multiplexing system in the LTE system (as $I_{PRB}$ and $I_{SC}$ mentioned above) or part of frequency domain position information of narrow band orthogonal frequency division multiplexing system in the said LTE system (as either $I_{PRB}$ or $I_{SC}$ above). The frequency domain position information is indicated by a signaling carried in a physical broadcast channel.

In which, the synchronization signal mentioned above is not transmitted on the center subcarrier in narrow band orthogonal frequency division multiplexing system.

Here, synchronization signals include primary synchronization signal and secondary synchronization signal.

In one embodiment, the primary synchronization signal is transmitted in subframe # k located on an odd-numbered radio frame while the secondary synchronization signal is transmitted in subframe # k located on an even-numbered radio frame, in which the value of k includes 1, 2, 3, 6, 7, and 8. Alternatively, the primary synchronization signal is transmitted in subframe # m located on an even-numbered radio frame while the said secondary synchronization signal is transmitted in subframe # m located on an odd-numbered radio frame, in which the value of m includes 1, 2, 3, 4, 6, 7, and 8. The subframe index starts from zero.

In one embodiment, the primary synchronization signal is transmitted in subframe # n located on an odd-numbered radio frame while the secondary synchronization signal is transmitted in subframe # n located on an even-numbered radio frame, in which the value of n includes 0, 4, 5, and 9. Alternatively, the primary synchronization signal is transmitted in subframe # h located on an even-numbered radio frame while the secondary synchronization signal is transmitted in subframe # h located on an odd-numbered radio frame, in which the value of h includes 0, 4, 5, and 9. The subframe index starts from zero.

Here, the number of OFDM symbols in t the subframe used to transmit the synchronization signal is 4, 6, 8, 9, 10, or 11.

The following options are available as the alternative: the 4 OFDM symbols including the last two OFDM symbols in each slot of the subframe; or the 6 OFDM symbols including the last 6 continuous OFDM symbols of the subframe; or the 6 OFDM symbols including the last two OFDM symbols in each slot of the subframe, the third and the fourth OFDM symbols in the second slot of the subframe; or the 6 OFDM symbols including the last two OFDM symbols in each slot of the subframe, the third OFDM symbol in each slot of the subframe; the 8 OFDM symbols including the last 8 continuous OFDM symbols of the subframe; or the 9 OFDM symbols including the last 9 continuous OFDM symbols of the subframe; or the 10 OFDM symbols including the last 10 continuous OFDM symbols of the subframe; or the 11 OFDM symbols including the last 11 continuous OFDM symbols of the subframe.

When the number of the synchronization signal OFDM symbols is greater than 6 and the main consideration is resource overlapping scenario between the synchronization channel and the cell reference signal, the number of OFDM symbols used to transmit synchronization signal should be further updated to 8, 9, 10, or 11 in order to guarantee the performance of the synchronization channel under that scenario.

When the number of the synchronization signal OFDM symbols is greater than 6 and the main consideration is resource non-overlapping (less overlapping) scenario between the synchronization channel and the cell reference signal, OFDM symbols which is not used to transmit cell-specific reference signal should be selected in priority in order to reduce the mutual influence between each other.

Different types of cyclic prefix must be taken into consideration, and definition of normal cyclic prefix and extended cyclic prefix should be given separately. For example, normal cyclic prefix and extended cyclic prefix choose different OFDM symbol quantities to transmit synchronization channel or normal cyclic prefix and extended cyclic prefix choose the same OFDM signal quantity to transmit synchronization channel, wherein the positions of corresponding OFDM signals are different.

Application One

In normal cyclic prefix, the 6 OFDM symbols include the last two OFDM symbols in each slot of the subframe, and the third and the fourth OFDM symbols in the second slot of the subframe.

In extended cyclic prefix, the 6 OFDM symbols include the last two OFDM symbols in each slot of the subframe, and the third OFDM symbol in each slot of the subframe.

Application Two

In normal cyclic prefix, the number of OFDM symbols of transmission synchronization channel is 8 or 9.

In extended cyclic prefix, the number of OFDM symbol of transmission synchronization channel is 9, 10 or 11.

Or utilize a unique mapping mode in both normal cyclic prefix and extended cyclic prefix:

Application One

In normal cyclic prefix, the OFDM symbol number of transmission synchronization channel is 6. The 6 OFDM symbols include the last two OFDM symbols in each slot of the subframe and the third OFDM symbol in the second slot of the subframe.

In extended cyclic prefix, the OFDM symbol number of transmission synchronization channel is 6. The 6 OFDM symbols include the last two OFDM symbols in each slot of the subframe and the third OFDM symbol in each slot of the subframe.

Application Two

In normal cyclic prefix, the number of OFDM symbol of transmission synchronization channel is 4. The 4 OFDM symbols include the last two OFDM symbols in each slot of the subframe.

In extended cyclic prefix, the number of OFDM symbol of transmission synchronization channel is 4. The 4 OFDM symbols include the last two OFDM symbols in each slot of the subframe.

In one embodiment, step 12 includes transmitting a reference signal on one or more subcarriers in the determined narrow band orthogonal frequency division multiplexing system.

In one embodiment, the transmitting reference signals on one or more subcarriers in the determined narrow band orthogonal frequency division multiplexing system includes:

transmitting the reference signals on one or more subcarriers in a subcarrier set of {0, 3, 6, 9, . . . , $$3*\lfloor \frac{M_{BW}}{3} \rfloor + N_{ID}^{cell} \bmod 3\}$$

which are selected from the subcarriers in the determined narrow band orthogonal frequency division multiplexing system; here, $M_{BW}$ is an integer greater than 3, $N_{ID}^{cell}$ is the cell identity code in LTE system, mod is modular arithmetic, and represents floor function.

In one embodiment, the transmitted reference signal include: the same reference signal as the cell-specific reference signal corresponding with $M_{BW}$ subcarriers transmission in the LTE system and/or the subset of the cell-specific reference signals corresponding with $M_{BW}$ subcarriers transmission in the LTE system. $M_{BW}$ is the subcarrier number included in the narrow band orthogonal frequency division multiplexing system. For example, the transmitted reference signals are the same as the cell reference signals corresponding with $M_{BW}$ subcarriers transmission in the LTE system in some subframes. In other subframes, the transmitted reference signals are the subset of the cell reference signal corresponding with $M_{BW}$ subcarriers transmission in the LTE system.

When the transmitted reference signals are the subset of the cell-specific reference signals corresponding with $M_{BW}$ subcarriers transmission in the LTE system, the transmitted reference signals include:

cell-specific reference signal transmitted by part of the antenna ports in the LTE system on the corresponding $M_{BW}$ subcarriers; that is, the cell-specific reference signal of antenna port 0 can be selected alone to transmit from cell reference signals of a plurality of antenna ports in LTE system; and/or the cell-specific reference signals of the subset corresponding $M_{BW}$ subcarriers on part of the antenna ports in the LTE system.

In one embodiment, the transmitted reference signal is determined on the basis of the allocated cell identity code. The difference between the allocated cell identity and that in the LTE system should be the multiple of 3.

Here, the reference signal is not transmitted on the center subcarrier of the narrow band orthogonal frequency division multiplexing system.

What needs more explanation is the transmission mentioned for the methods provided in the embodiment, including emission and/or reception.

Figure 2:
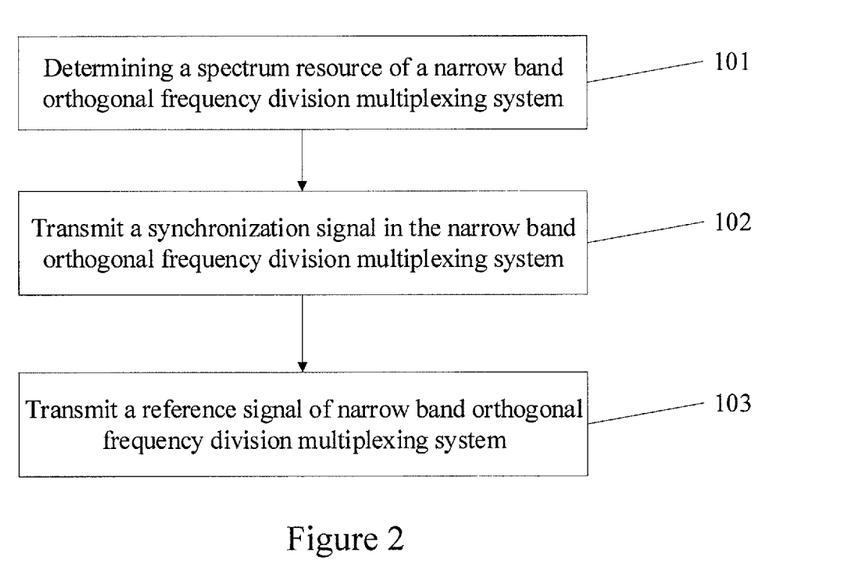
FIG. 2 is a flow chart of a method for transmitting narrow band orthogonal frequency division multiplexing signals according to further embodiments of the present disclosure.

FIG. 2 is a flow chart of a method for transmitting narrow band orthogonal frequency division multiplexing signals according to some embodiments of the present disclosure. As shown in FIG. 2, the description of the embodiment is as below:

Step 101: determining a spectrum resource of a narrow band orthogonal frequency division multiplexing system.

Base station can determine the spectrum resource of a narrow band orthogonal frequency division multiplexing system according to a LTE system bandwidth shared with the narrow band orthogonal frequency division multiplexing system. The bandwidth in LTE system includes $N_{BW}$ available subcarriers, and accordingly the bandwidth includes $N_{PRB}$ PRBs and $$N_{PRB} = \frac{N_{BW}}{12}.$$

The subcarrier index is 0, 1, 2, . . . , $N_{BW}-1$ while PRB index is 0, 1, 2, . . . , $N_{PRB}-1$, and the PRB index in the bandwidth in the LTE system of the center subcarrier among $M_{BW}$ subcarriers in the narrow band orthogonal frequency division multiplexing system is $I_{PRB}$ ($I_{PRB}=0, 1 \ldots$). The carrier index in PRB of the said center subcarrier is $I_{SC}$ ($I_{SC}=0,1 \ldots$). $M_{BW}$ is an integer greater than 3.

When $N_{BW}$ mod 24 0, $I_{PRB}$ and $I_{SC}$ of the center subcarrier in the spectrum resources selected by base station satisfy one of the followings:

While $I_{PRB}$ mod 5 0 and $I_{PRB}$ is not equal to zero and $I_{PRB}$ is less than $N_{PRB}/2$, $I_{SC}$ 0;

While $I_{PRB}$ mod 5 1 and when $I_{PRB}$ is less than $N_{PRB}/2$, $I_{SC}$ 8; if $I_{PRB}$ is greater than $N_{PRB}/2$, then $I_{SC}$ 7;

While $I_{PRB}$ mod 5 3 and when $I_{PRB}$ is less than $N_{PRB}/2$, $I_{SC}$ 4; if $I_{PRB}$ is greater than $N_{PRB}/2$, then $I_{SC}$ 3;

While $I_{PRB}$ mod 5 4 and $I_{PRB}$ is greater than $N_{PRB}/2$, then $I_{SC}$ 11;

In above, mod represents modular arithmetic.

Therefore, base station can define the center subcarrier in the determined narrow band orthogonal frequency division multiplexing system as well as the said $M_{BW}$ subcarriers according to one of the conditions above. For example, if the bandwidth in the said LTE system includes $N_{BW}=1200$ subcarriers and when $N_{PRB}=100$, base station can select the center subcarrier according to the second condition above (that is while $I_{PRB}$ mod 5 1 and $I_{PRB}$ is less than $N_{PRB}/2$, $I_{SC}$ 8; if $I_{PRB}$ is greater than $N_{PRB}/2$, then $I_{SC}$ 7). In which, the $I_{PRB}$ that satisfies the second condition above is 1, 6, 11, 16, . . . , 96; base station can select $I_{PRB}$ 1 and then the $I_{SC}$ 8.

When $N_{BW}$ mod 24 12, $I_{PRB}$ and $I_{SC}$ of the center subcarrier in the spectrum resources selected by base station satisfy one of the followings:

While $I_{PRB}$ mod 5 0 and when $I_{PRB}$ is less than $$\lfloor \frac{N_{PRB}}{2} \rfloor,$$

$I_{SC}$ 10; if $I_{PRB}$ is greater than $$\lfloor \frac{N_{PRB}}{2} \rfloor,$$

then $I_{SC}$ 9;

While $I_{PRB}$ mod 5 2 and when $I_{PRB}$ is less than $$\frac{N_{PRB}}{2},$$

$I_{SC}$ 6; if $I_{PRB}$ is greater than $$\left\lfloor \frac{N_{PRB}}{2} \right\rfloor,$$

then $I_{SC}$ 5;
While $I_{PRB}$ mod 5 4 and when $I_{PRB}$ is less than $$\left\lfloor \frac{N_{PRB}}{2} \right\rfloor,$$

$I_{SC}$ 2; if $I_{PRB}$ is greater than $$\frac{N_{PRB}}{2},$$

then $I_{SC}$ 1;
In above, mod is modular arithmetic and represents floor function.

Therefore, base station can define the center subcarrier in the determined narrow band orthogonal frequency division multiplexing system as well as the said $M_{BW}$ subcarriers according to one of the conditions above. For example, if the bandwidth in the said LTE system includes $N_{BW}$=300 subcarriers and when $N_{PRB}$ 25, base station can confirm the center subcarrier according to the first condition above (that is while $I_{PRB}$ mod 5 0 and $I_{PRB}$ is less than $$\left\lfloor \frac{N_{PRB}}{2} \right\rfloor,$$

$I_{SC}$ 10; if $I_{PRB}$ is greater than $$\left\lfloor \frac{N_{PRB}}{2} \right\rfloor,$$

then $I_{SC}$ 9). In which, $I_{PRB}$ that satisfies the first condition above is 0, 5, 15, 20; base station can select $I_{PRB}$ 5 and then the $I_{SC}$ 10.

Moreover, the $M_{BW}$ subcarriers in the narrow band orthogonal frequency division multiplexing system do not overlap with the 72 center subcarriers in LTE system when $N_{BW}$ is greater than 72.

Step 102: transmitting a synchronization signal in the narrow band orthogonal frequency division multiplexing system.

Base station may transmit the synchronization signal on one or more subcarriers from $M_{BW}$ subcarriers selected above. Among them, the subcarriers occupied by the synchronization signals for different OFDM symbols can be different and the synchronization signal should carry at least one of the following information:

the cell identity information of the narrow band orthogonal frequency division multiplexing system, the carried cell identity information can be the same as that in LTE system when the cell identity information is carried by synchronization signal;

the frequency domain position information of the narrow band orthogonal frequency division multiplexing system in LTE system, such as the frequency domain position of the said center subcarrier in LTE system (as $I_{PRB}$, $I_{SC}$ mentioned above), or part of the frequency domain position information of the said narrow band orthogonal frequency division multiplexing system in LTE system (as either $I_{PRB}$ or $I_{SC}$ above).

In relevant systems, a terminal of a narrow band orthogonal frequency division multiplexing system needs to correctly detect information on the 6 center PRBs of a LTE system, such as synchronization signals or broadcast signals transmitted on the 6 center PRBs at first, then it can switch to the corresponding narrow band frequency spectrum. Due to the bandwidths of synchronization signals and broadcasting signals are 6 PRBs, this means the bandwidth capacity of a narrow band orthogonal frequency division multiplexing system terminal is at least 6 PRBs and it is very unfavorable of reducing the cost of the narrow band orthogonal frequency division multiplexing system terminal. In addition, the above switching also affects the speed of narrow band orthogonal frequency division multiplexing system terminal accessing to narrow band orthogonal frequency division multiplexing system. But in the present embodiment, the bandwidth capacity of narrow band orthogonal frequency division multiplexing system terminal is only required to be no less than $M_{BW}$ subcarriers. Moreover, the transmission position of the above synchronization signals is also easy for a terminal to run a rapid detection on the synchronization signals; the speed of terminal accessing to the system is enhanced without any extra hardware costs and power consumption.

Step 103: transmitting a reference signal of narrow band orthogonal frequency division multiplexing system.

Base station transmits reference signals on one or more subcarriers from $M_{BW}$ subcarriers selected above. The transmitted reference signals are the same as the cell reference signals transmitted on corresponding $M_{BW}$ subcarriers in the LTE system or the subset of the cell reference signals transmitted on corresponding $M_{BW}$ subcarriers in the said LTE system.

In another embodiment, the base station can determine the spectrum resources of a narrow band orthogonal frequency division multiplexing system according to the bandwidth of LTE system which share bandwidth with the narrow band orthogonal frequency division multiplexing system and the cell identify of the LTE system.

If the cell identity of a LTE system is $N_{ID}^{cell}$ and the bandwidth of LTE system includes $N_{BW}$ available subcarriers, accordingly, the bandwidth includes $N_{PRB}$ PRBs (Physical Resource Block), and $$N_{PRB} = \frac{N_{BW}}{12}.$$

The subcarrier index is 0, 1, 2, . . . , $N_{BW}$−1 while PRB index is 0, 1, 2, . . . , $N_{PRB}$−1, and both $N_{BW}$ and $N_{PRB}$ are integers greater than zero. The bandwidth in narrow band orthogonal frequency division multiplexing system includes $M_{BW}$ subcarriers, and $M_{BW}$ is an integer greater than 3. The $M_{BW}$ subcarriers use a certain subcarrier as the center according to the corresponding frequencies, and the subcarrier is called center subcarrier. When $M_{BW}$ is an odd number, the number of the subcarriers on both sides of the center subcarrier is equal; while BW is an even number, the quantity difference between the subcarriers on both sides of the center subcarrier is 1. The PRB index in LTE bandwidth of the center subcarrier among $M_{BW}$ subcarriers in narrow band orthogonal frequency division multiplexing system is $I_{PRB}$ and the carrier index of the said center subcarrier in PRB is $I_{SC}$; $I_{PRB}$ and $I_{SC}$ are integers greater than or equal to zero.

When $N_{ID}^{cell}$ mod 3=0 and $N_{BW}$ mod 24 0, $I_{PRB}$ and $I_{SC}$ satisfy one of the following:

While $I_{PRB}$ mod 5 1 and $I_{PRB}$ is less than $N_{PRB}/2$, $I_{SC}$ 8; if $I_{PRB}$ is greater than $N_{PRB}/2$, then $I_{SC}$ 7;

While $I_{PRB}$ mod 5 3 and $I_{PRB}$ is less than $N_{PRB}/2$, $I_{SC}$ 4;

While $I_{PRB}$ mod 5 4 and $I_{PRB}$ is greater than $N_{PRB}/2$, then $I_{SC}$ 11;

In above, mod represents modular arithmetic.

When $N_{ID}^{cell}$ mod 3=0 and $N_{BW}$ mod 24 12, $I_{PRB}$ and $I_{SC}$ satisfy one of the followings:

While $I_{PRB}$ mod 5 0 and $I_{PRB}$ is less than $$\frac{N_{PRB}}{2},$$

$I_{SC}$ 10;

While $I_{PRB}$ mod 5 2 and $I_{PRB}$ is greater than $$\left\lfloor \frac{N_{PRB}}{2} \right\rfloor,$$

$I_{SC}$ 5;

While $I_{PRB}$ mod 5 4 and when $I_{PRB}$ is less than $$\left\lfloor \frac{N_{PRB}}{2} \right\rfloor,$$

$I_{SC}$ 2; if $I_{PRB}$ is greater than $$\frac{N_{PRB}}{2},$$

then $I_{SC}$ 1;

In above, mod is modular arithmetic and represents floor function.

When $N_{ID}^{cell}$ mod 3=1 and $N_{BW}$ mod 24 0, $I_{PRB}$ and $I_{SC}$ satisfy one of the following:

While $I_{PRB}$ mod 5 0 and $I_{PRB}$ is not equal to zero and $I_{PRB}$ is less than $N_{PRB}/2$, $I_{SC}$ 0;

While $I_{PRB}$ mod 5 1 and $I_{PRB}$ is less than $N_{PRB}/2$, $I_{SC}$ 8;

While $I_{PRB}$ mod 5 3 and $I_{PRB}$ is greater than $N_{PRB}/2$, $I_{SC}$ 3;

While $I_{PRB}$ mod 5 4 and $I_{PRB}$ is greater than $N_{PRB}/2$, $I_{SC}$ 11;

In above, mod represents modular arithmetic.

When $N_{ID}^{cell}$ mod 3=1 and $N_{BW}$ mod 24 12, $I_{PRB}$ and $I_{SC}$ satisfy one of the followings:

While $I_{PRB}$ mod 5 0 and $I_{PRB}$ is less than $$\left\lfloor \frac{N_{PRB}}{2} \right\rfloor,$$

$I_{SC}$ 9;

While $I_{PRB}$ mod 5 2 and when $I_{PRB}$ is less than $$\left\lfloor \frac{N_{PRB}}{2} \right\rfloor,$$

$I_{SC}$ 6; if $I_{PRB}$ is greater than $$\left\lfloor \frac{N_{PRB}}{2} \right\rfloor,$$

then $I_{SC}$ 5;

While $I_{PRB}$ mod 5 4 and $I_{PRB}$ is less than $$\left\lfloor \frac{N_{PRB}}{2} \right\rfloor,$$

$I_{SC}$ 2;

In above, mod is modular arithmetic and $\lfloor\ \rfloor$ represents floor function.

When $N_{ID}^{cell}$ mod 3 2 and $N_{BW}$ mod 24 0, $I_{PRB}$ and $I_{SC}$ satisfy one of the followings:

While $I_{PRB}$ mod 5 0 and $I_{PRB}$ is not equal to zero and $I_{PRB}$ is less than $N_{PRB}/2$, $I_{SC}$ 0;

While $I_{PRB}$ mod 5 1 and $I_{PRB}$ is greater than $N_{PRB}/2$, $I_{SC}$ 7;

While $I_{PRB}$ mod 5 3 and when $I_{PRB}$ is less than $N_{PRB}/2$, $I_{SC}$ 4; if $I_{PRB}$ is greater than $N_{PRB}/2$, $I_{SC}$ 3;

While $I_{PRB}$ mod 5 4 and $I_{PRB}$ is greater than $N_{PRB}/2$, $I_{SC}$ 11;

In above, mod represents modular arithmetic.

When $N_{ID}^{cell}$ mod 3=2 and $N_{BW}$ mod 24 12, $I_{PRB}$ and $I_{SC}$ satisfy one of the followings:

While $I_{PRB}$ mod 5 0 and $I_{PRB}$ is greater than $$\left\lfloor \frac{N_{PRB}}{2} \right\rfloor,$$

$I_{SC}$ 9;

While $I_{PRB}$ mod 5 2 and when $I_{PRB}$ is less than $$\frac{N_{PRB}}{2},$$

$I_{SC}$ 6;

While $I_{PRB}$ mod 5 4 and $I_{PRB}$ is greater than $$\left\lfloor \frac{N_{PRB}}{2} \right\rfloor,$$

$I_{SC}$ 1;

In above, mod is modular arithmetic and $\lfloor\ \rfloor$ represents floor function.

In the embodiment, base station transmits the reference signal on one or more subcarriers from the selected $M_{BW}$ subcarriers above. Alternatively, in terms of reference signals transmitted, base station transmits the reference signals on one or more subcarriers in the subcarrier set of $\{0, 3, 6, 9, \ldots,$ $$3 * \frac{M_{BW}}{3} + N_{ID}^{cell} \bmod 3\},$$

which is the selected set for the $M_{BW}$ subcarriers.

That is:

When $N_{ID}^{cell}$ mod 3=0, base station transmits reference signals on one or more subcarriers from the subcarrier set of $\{0, 3, 6, 9, \ldots,$ $$3 * \lfloor \frac{M_{BW}}{3} \rfloor \}$$

on the selected $M_{BW}$ subcarriers above.

When $N_{ID}^{cell}$ mod 3=1, base station transmits reference signals on one or more subcarriers from the subcarrier set of $\{1, 4, 7, 10, \ldots,$ $$3 * \lfloor \frac{M_{BW}}{3} \rfloor + 1 \}$$

on the selected $M_{BW}$ subcarriers above.

When $N_{ID}^{cell}$ mod 3=2, base station transmits reference signals on one or more subcarriers from the subcarrier set of $\{2, 5, 8, 11, \ldots,$ $$3 * \lfloor \frac{M_{BW}}{3} \rfloor + 2 \}$$

on the selected $M_{BW}$ subcarriers above.

In this case, the transmitted reference signals are not only with all the advantages described with respect to previous embodiments, but also are not transmitted on the center subcarrier in narrow band orthogonal frequency division multiplexing system. Therefore, the reference signals received by the terminal of the narrow band orthogonal frequency division multiplexing system won't be affected when the said center subcarrier is used as DC subcarrier of the narrow band orthogonal frequency division multiplexing system.

Moreover, on top of the above advantage, base station can also generate the said reference signal according to a configured cell identity. The configured cell identity here can be different from the cell identity in the LTE system (of course, it can be the same). Furthermore, the difference between the configured cell identity and a cell identity of the LTE system is a multiple of 3.

In another embodiment, the reference signals transmitted by a base station can also be the same as cell reference signals transmitted on the corresponding $M_{BW}$ subcarriers of a LTE system or be a subset of the cell reference signals transmitted on the corresponding $M_{BW}$ subcarriers in the LTE system. When the center subcarrier is used as DC subcarrier of a narrow band orthogonal frequency division multiplexing system, it can also avoid the following situations: a terminal of LTE system conducts demodulation as if reference signal is transmitted on that carrier, whereas in fact the carrier doesn't carry any reference signal. The subcarrier is used as DC subcarrier of a narrow band orthogonal frequency division multiplexing system, thereby cause significant negative impact on the demodulation performance of the LTE system terminal.

Figure 3:
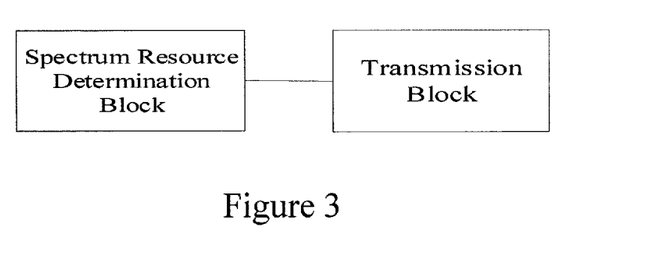
FIG. 3 presents a schematic diagram of a device for transmitting narrow band orthogonal frequency division multiplexing signals according to some embodiments of the present disclosure.

FIG. 3 presents the schematic diagram of a device for transmitting narrow band orthogonal frequency division multiplexing signals according to an embodiment of the present disclosure. As shown on FIG. 3, the device for transmitting the narrow band orthogonal frequency division multiplexing signals provided in the embodiment, is applied to for example base stations and/or applied to terminals, comprising spectrum resource determination blocks and transmission blocks. The spectrum resource determination block determines spectrum resources of a narrow band orthogonal frequency division multiplexing system in LTE system bandwidth which is shared with the narrow band orthogonal frequency division multiplexing system according to a resource selection strategy. The setup for transmission block is to transmit narrow band orthogonal frequency division multiplexing signals on the determined spectrum resources of the narrow band orthogonal frequency division multiplexing system. In real applications, spectrum resources determination block refers to electronic devices with information processing capability, such as processors, while transmission block refers to communication components with information transmission capability, such as transmitter.

Here, the subcarrier spacing of narrow band orthogonal frequency division multiplexing signals is 15 kHz, the same as that of LTE system.

If the cell identity code in the LTE system is $N_{ID}^{cell}$ and the bandwidth of LTE system includes $N_{BW}$ available subcarriers, accordingly, the bandwidth includes $N_{PRB}$ PRBs (Physical Resource Block) as well as $$N_{PRB} = \frac{N_{BW}}{12}.$$

The subcarrier index is $0, 1, 2, \ldots, N_{BW}-1$ while PRB index is $0, 1, 2, \ldots, N_{PRB}-1$, and both $N_{BW}$ and $N_{PRB}$ are integers greater than zero. The bandwidth in narrow band orthogonal frequency division multiplexing system includes $M_{BW}$ subcarriers, and $M_{BW}$ is an integer greater than 3. The said $M_{BW}$ subcarriers use a certain subcarrier as the center according to the corresponding frequencies, and the subcarrier is called center subcarrier. When $M_{BW}$ is an odd number, the number of the subcarriers on both sides of the center subcarrier is equal; while $M_{BW}$ is an even number, the quantity difference between the subcarriers on both sides of the center subcarrier is 1. The PRB index in LTE bandwidth of the center subcarrier among $M_{BW}$ subcarriers in narrow band orthogonal frequency division multiplexing system is $I_{PRB}$ and the carrier index of the said center subcarrier in PRB is $I_{SC}$; $I_{PRB}$ and $I_{SC}$ are integers greater than or equal to zero.

In one embodiment, the resource selection strategy includes:

When $N_{BW}$ mod 24 0, $I_{PRB}$ and $I_{SC}$ satisfy one of the followings:

While $I_{PRB}$ mod 5 0 and $I_{PRB}$ is not equal to zero and $I_{PRB}$ is less than $N_{PRB}/2$, $I_{SC}$ 0;

While $I_{PRB}$ mod 5 1 and when $I_{PRB}$ is less than $N_{PRB}/2$, $I_{SC}$ 8; if $I_{PRB}$ is greater than $N_{PRB}/2$, then $I_{SC}$ 7;

While $I_{PRB}$ mod 5 3 and when $I_{PRB}$ is less than $N_{PRB}/2$, $I_{SC}$ 4; if $I_{PRB}$ is greater than $N_{PRB}/2$, then $I_{SC}$ 3;

While $I_{PRB}$ mod 5 4 and $I_{PRB}$ is greater than $N_{PRB}/2$, $I_{SC}$ 11;

In above, mod represents modular arithmetic.

Here, $M_{BW}$ subcarriers in the said narrow band orthogonal frequency division multiplexing system are not overlapped with the 72 subcarriers in LTE system when $N_{BW}$ is greater than 72.

In one embodiment, resource selection strategy includes:

When $N_{BW}$ mod 24 12, $I_{PRB}$ and $I_{SC}$ satisfy one of the followings:

While $I_{PRB}$ mod 5 0 and $I_{PRB}$ is less than $$\left\lfloor \frac{N_{PRB}}{2} \right\rfloor,$$

$I_{SC}$ 10; if $I_{PRB}$ is greater than $$\left\lfloor \frac{N_{PRB}}{2} \right\rfloor,$$

$I_{SC}$ 9;

While $I_{PRB}$ mod 5 2 and when $I_{PRB}$ is less than $$\frac{N_{PRB}}{2},$$

$I_{SC}$ 6; if $I_{PRB}$ is greater than $$\left\lfloor \frac{N_{PRB}}{2} \right\rfloor,$$

then $I_{SC}$ 5;

While $I_{PRB}$ mod 5 4 and $I_{PRB}$ is greater than $$\left\lfloor \frac{N_{PRB}}{2} \right\rfloor,$$

$I_{SC}$ 2; if $I_{PRB}$ is greater than $$\left\lfloor \frac{N_{PRB}}{2} \right\rfloor,$$

$I_{SC}$ 1;

In above, mod is modular arithmetic and represents floor function.

Here, $M_{BW}$ subcarriers in the said narrow band orthogonal frequency division multiplexing system are not overlapped with the 72 subcarriers in LTE system when $N_{BW}$ is greater than 72.

In one embodiment, resource selection strategy includes:

When $N_{ID}^{cell}$ mod 3=2 and $N_{BW}$ mod 24 0, $I_{PRB}$ and $I_{SC}$ satisfy one of the followings:

While $I_{PRB}$ mod 5 1 and when $I_{PRB}$ is less than $N_{PRB}/2$; $I_{SC}$ 8; if $I_{PRB}$ is greater than $N_{PRB}/2$, $I_{SC}$ 7;

While $I_{PRB}$ mod 5 3 and $I_{PRB}$ is less than $N_{PRB}/2$, $I_{SC}$ 4;

While $I_{PRB}$ mod 5 4 and $I_{PRB}$ is greater than $N_{PRB}/2$, $I_{SC}$ 11;

In above, mod represents modular arithmetic.

In one embodiment, resource selection strategy includes:

When $N_{ID}^{cell}$ mod 3=2 and $N_{BW}$ mod 24 12, $I_{PRB}$ and $I_{SC}$ satisfy one of the followings:

While $I_{PRB}$ mod 5 0 and $I_{PRB}$ is less than $$\frac{N_{PRB}}{2},$$

$I_{SC}$ 10;

While $I_{PRB}$ mod 5 2 and $I_{PRB}$ is greater than $$\left\lfloor \frac{N_{PRB}}{2} \right\rfloor,$$

$I_{SC}$ 5;

While $I_{PRB}$ mod 5 4 and $I_{PRB}$ is less than $$\left\lfloor \frac{N_{PRB}}{2} \right\rfloor,$$

$I_{SC}$ 2; if $I_{PRB}$ is greater than $$\frac{N_{PRB}}{2},$$

then $I_{SC}$ 1;

In above, mod is modular arithmetic and represents floor function.

In one embodiment, resource selection strategy includes:

When $N_{ID}^{cell}$ mod 3=1 and $N_{BW}$ mod 24 0, $I_{PRB}$ and $I_{SC}$ satisfy one of the followings:

While $I_{PRB}$ mod 5 0 and $I_{PRB}$ is not equal to zero and $I_{PRB}$ is less than $N_{PRB}/2$, $I_{SC}$ 0;

While $I_{PRB}$ mod 5 1 and $I_{PRB}$ is less than $N_{PRB}/2$, $I_{SC}$ 8;

While $I_{PRB}$ mod 5 3 and $I_{PRB}$ is greater than $N_{PRB}/2$, $I_{SC}$ 3;

While $I_{PRB}$ mod 5 4 and $I_{PRB}$ is greater than $N_{PRB}/2$, $I_{SC}$ 11;

In above, mod represents modular arithmetic.

In one embodiment, resource selection strategy includes:

When $N_{ID}^{cell}$ mod 3 1 and $N_{BW}$ mod 24 12, $I_{PRB}$ and $I_{SC}$ satisfy one of the followings:

While $I_{PRB}$ mod 5 0 and $I_{PRB}$ is less than $$\left\lfloor \frac{N_{PRB}}{2} \right\rfloor,$$

$I_{SC}$ 9;

While $I_{PRB}$ mod 5 2 and when $I_{PRB}$ is less than $N_{PRB}/2$, $I_{SC}$ 6; if $I_{PRB}$ is greater than $$\left\lfloor \frac{N_{PRB}}{2} \right\rfloor,$$

$I_{SC}$ 5;

While $I_{PRB}$ mod 5 4 and $I_{PRB}$ is less than $$\lfloor \frac{N_{PRB}}{2} \rfloor,$$

$I_{SC}$ 2;

In above, mod is modular arithmetic and represents floor function.

In one embodiment, resource selection strategy includes:
When $N_{ID}^{cell}$ mod 3=2 and $N_{BW}$ mod 24 0, $I_{PRB}$ and $I_{SC}$ satisfy one of the followings:
While $I_{PRB}$ mod 5 0 and $I_{PRB}$ is not equal to zero and $I_{PRB}$ is less than $N_{PRB}/2$, $I_{SC}$ 0;
While $I_{PRB}$ mod 5 1 and $I_{PRB}$ is greater than $N_{PRB}/2$, $I_{SC}$ 7;
While $I_{PRB}$ mod 5 3 and when $I_{PRB}$ is less than $N_{PRB}/2$, $I_{SC}$ 4; if $I_{PRB}$ is greater than $N_{PRB}/2$, $I_{SC}$ 3;
While $I_{PRB}$ mod 5 4 and $I_{PRB}$ is greater than $N_{PRB}/2$, $I_{SC}$ 11;

In above, mod represents modular arithmetic.

In one embodiment, resource selection strategy includes:
When $N_{ID}^{cell}$ mod 3=2 and $N_{BW}$ mod 24 12, $I_{PRB}$ and $I_{SC}$ satisfy one of the followings:
While $I_{PRB}$ mod 5 0 and $I_{PRB}$ is greater than $$\lfloor \frac{N_{PRB}}{2} \rfloor,$$

$I_{SC}$ 9;
While $I_{PRB}$ mod 5 2 and $I_{PRB}$ is less than $$\lfloor \frac{N_{PRB}}{2} \rfloor,$$

$I_{SC}$ 6;
While $I_{PRB}$ mod 5 4 and $I_{PRB}$ is greater than $$\frac{N_{PRB}}{2},$$

$I_{SC}$ 1;
In above, mod is modular arithmetic and represents floor function.

In one embodiment, the setup of transmission block is to transmit the narrow band orthogonal frequency division multiplexing signal from the spectrum resources in the narrow band orthogonal frequency division multiplexing system through methods below. Transmitting synchronization signals on one or more subcarriers in the confirmed narrow band orthogonal frequency division multiplexing system, in which, in different narrow band orthogonal frequency division multiplexing OFDM symbols, the synchronization signals occupies different subcarriers.

Alternatively, the synchronization signal should carry at least one of the following information:
cell identity information in the narrow band orthogonal frequency division multiplexing system;
frequency domain position information of the narrow band orthogonal frequency division multiplexing system in the LTE system;

Alternatively, the synchronization signal is not transmitted on the center subcarrier of the narrow band orthogonal frequency division multiplexing system.

Or, the frequency domain position information is indicated by a t signaling carried in a physical broadcast channel.

Or, the synchronization signal include primary synchronization signal and secondary synchronization signals.

Alternatively, the primary synchronization signal is transmitted in subframe # k located on an odd-numbered radio frame while the secondary synchronization signal is transmitted in subframe # k located on an even-numbered radio frame, in which the value of k includes 1, 2, 3, 6, 7, 8; or, the primary synchronization signal is transmitted in subframe # m located on an even-numbered radio frame while the secondary synchronization signal is transmitted in subframe # m located on an odd-numbered radio frame, in which the value of m includes 1, 2, 3, 4, 6, 7, 8. The subframe index starts from zero.

Alternatively, the primary synchronization signal is transmitted in subframe # n located on an odd-numbered radio frame while the secondary synchronization signal is transmitted in subframe # n located on an even-numbered radio frame, in which the value of n includes 0, 4, 5, 9; or, the primary synchronization signal is transmitted in subframe # h located on an even-numbered radio frame while the secondary synchronization signal is transmitted in subframe # h located on an odd-numbered radio frame, in which the value of h includes 0, 4, 5, 9. The subframe index starts from zero.

Alternatively, the number of OFDM symbols in the subframe used to transmit the synchronization signal is 4, 6, 8, 9, 10, or 11.

Alternatively, the 4 OFDM symbols include the last two OFDM symbols in each slot of the subframe; or the 6 OFDM symbols include the last 6 continuous OFDM symbols of the subframe; or the 6 OFDM symbols include the last two OFDM symbols in each slot of the subframe, the third and the fourth OFDM symbols in the second slot of the subframe; or the 6 OFDM symbols include the last two OFDM symbols in each slot of the subframe, the third OFDM symbol in each slot of the subframe; the 8 OFDM symbols include the last 8 continuous OFDM symbols of the subframe; or the 9 OFDM symbols include the last 9 continuous OFDM symbols of the subframe; or the 10 OFDM symbols include the last 10 continuous OFDM symbols of the subframe; or the 11 OFDM symbols include the last 11 continuous OFDM symbols of the subframe.

In one embodiment, the setup of the transmission block is to transmit the narrow band orthogonal frequency division multiplexing signal using the spectrum resource of the narrow band orthogonal frequency division multiplexing system through methods below: transmitting a reference signal on one or more subcarriers in the confirmed narrow band orthogonal frequency division multiplexing system.

Alternatively, the setup of the transmission block is to transmit the reference signal on one or more subcarriers in the determined narrow band orthogonal frequency division multiplexing system through the following methods.

Transmit the reference signal on one or more subcarriers in the subcarrier set of $\{0, 3, 6, 9, \ldots,$ $$3 * \frac{M_{BW}}{3} + (N_{ID}^{cell} \bmod 3)\},$$

which is the selected set from the $M_{BW}$ subcarriers in the determined narrow band orthogonal frequency division multiplexing system. Here, $M_{BW}$ is an integer greater than 3, $N_{ID}^{cell}$ is the cell identity code in LTE system, mod is modular arithmetic and $\lfloor\ \rfloor$ represents floor function.

Alternatively, the transmitted reference signal include: the same reference signal transmitted in the corresponding $M_{BW}$ subcarriers in the LTE system and/or the subset of the cell-specific reference signals transmitted in the corresponding $M_{BW}$ subcarriers in the LTE system. Here, $M_{BW}$ is the number of subcarrier included in the narrow band orthogonal frequency division multiplexing system.

Alternatively, when the transmitted reference signal is the subset of the cell-specific reference signals transmitted in the corresponding $M_{BW}$ subcarriers in the LTE system, the transmitted reference signal include:

the cell-specific reference signal transmitted on corresponding $M_{BW}$ subcarriers on part of the antenna ports of the LTE system; and/or the cell-specific reference signal that are transmitted by part of the antenna ports of the LTE system corresponding with a subset of the $M_{BW}$ subcarriers.

Alternatively, the transmitted reference signal is determined by the allocated cell identity code and the difference between the allocated cell identity code and that in LTE system is a multiple of 3.

Alternatively, the reference signal is not transmitted on the center subcarrier in the narrow band orthogonal frequency division multiplexing system.

It is noted that the transmission mentioned as to the devices provided in the embodiments includes transmitting and/or receiving.

Moreover, the handling procedure of the devices mentioned above is the same as the procedures as to aforementioned methods; therefore, it is not repeated here.

In summary, according to the embodiments in present disclosure, when a narrow band orthogonal frequency division multiplexing system utilizes bandwidth resource in a LTE system bandwidth, terminals of narrow band orthogonal frequency division multiplexing system can detect synchronization signals transmitted from a base station more rapidly. The speed of terminal accessing system is enhanced without extra hardware costs and power consumption; furthermore, the reference signals of narrow band orthogonal frequency division multiplexing system can be used by conventional LTE system terminals as well as used by narrow band orthogonal frequency division multiplexing system terminals without any signaling overhead. While the utilization efficiency of reference signals is enhanced, the result of costs saving is achieved. In addition, the reference signals are not transmitted on the center subcarrier of narrow band orthogonal frequency division multiplexing system in the embodiments of present disclosure thereby the performance of LTE system terminals' modulation is enhanced.

The embodiments of present disclosure also provide a computer readable storage medium which stores computer executable instructions thereon. The computer executable instructions, when executed, carry out aforementioned methods of transmitting narrow band orthogonal frequency division multiplexing signals.

One of ordinary skill in the art will appreciate that all of or part of the steps described in the above methods can be performed by program instructing relevant hardware (such as processor). The program can be saved on computer readable storage medium, such as read-only memory, disk or CD. Alternatively, all of or part of the above embodiments can be implemented on one or more integrated circuits.

Accordingly, the modules/units in the above embodiments can be implemented by hardware such as implementing corresponding functions through integrated circuits, or they can be implemented through software functional blocks, such as implementing the corresponding functions through processors executing programs/instructions stored on a memory. The embodiments of present disclosure are not limited to any specific form of combination of hardware and software.

Above illustrates and describes the basic principles and main characteristics of the present application as well as its advantages. The present application is not limited to the above embodiments. The embodiments and description in the specification are only to explain the principle of the present application, and there can be variations and improvement without departing from the spirit and scope of the present application. These variations and improvement will still fall into the scope of protection of the present application.

INDUSTRIAL APPLICABILITY

The embodiments of the present application provide methods and devices for transmitting a narrow band orthogonal frequency division multiplexing signal which achieve transmitting a narrow band orthogonal frequency division multiplexing signal in LTE system bandwidth and further achieve signal detection that are convenient for terminals of narrow band orthogonal frequency division multiplexing system service and cost reduction. What's more, mutual interference between LTE system and narrow band orthogonal frequency division multiplexing system is reduced.

What is claimed is:

1. A method for transmitting a narrow band orthogonal frequency division multiplexing signal, the method comprising:

determining a spectrum resource of a narrow band orthogonal frequency division multiplexing system in a LTE system bandwidth according to a resource selection strategy, wherein the LTE system and the narrow band orthogonal frequency division multiplexing system share bandwidth; and transmitting a narrow band orthogonal frequency division multiplexing signal on the determined spectrum resource of the narrow band orthogonal frequency division multiplexing system, wherein the LTE system bandwidth includes $N_{BW}$ available subcarriers, the narrow band orthogonal frequency division multiplexing system bandwidth includes $M_{BW}$ subcarriers, and an index of a physical resource block (PRB), which corresponds to a center subcarrier of the $M_{BW}$ subcarriers of the narrow band orthogonal frequency division multiplexing system, in the LTE system bandwidth is $I_{PRB}$; and wherein $N_{BW}$ mod 24=12 and $I_{PRB}$ mod 5=2.

2. The method of claim 1, wherein transmitting the narrow band orthogonal frequency division multiplexing signal on the determined spectrum resource of the narrow band orthogonal frequency division multiplexing system comprises:

transmitting a synchronization signal on one or more subcarriers of the determined narrow band orthogonal frequency division multiplexing system, wherein, the synchronization signal occupies different subcarriers in different Orthogonal Frequency Division Multiplexing (OFDM) symbols.

3. The method of claim 2, wherein the synchronization signal carries at least one of the following information:
cell identity of the narrow band orthogonal frequency division multiplexing system;
frequency domain position of the narrow band orthogonal frequency division multiplexing system in the LTE system.

4. The method of claim 3, wherein the frequency domain position is indicated by a signaling carried in a physical broadcast channel.

5. The method of claim 2, wherein the synchronization signal comprises at least one of a primary synchronization signal and a secondary synchronization signal.

6. The method of claim 1, wherein transmitting the narrow band orthogonal frequency division multiplexing signals on the determined spectrum resource of the narrow band orthogonal frequency division multiplexing system comprises: transmitting a reference signal on one or more subcarriers in the determined narrow band orthogonal frequency division multiplexing system.

7. The method of claim 6, wherein the transmitted reference signal comprises: a reference signal same as the cell-specific reference signal transmitted over the corresponding $M_{BW}$ subcarriers in the LTE system, wherein the $M_{BW}$ is the number of subcarriers included in the narrow band orthogonal frequency division multiplexing system.

8. The method of claim 6, wherein the transmitted reference signal is determined based on a configured cell identity.

9. A device for transmitting a narrow band orthogonal frequency division multiplexing signal, the device comprising:
a spectrum resource determination block, configured to determine a spectrum resource of a narrow band orthogonal frequency division multiplexing system in a LTE system bandwidth according to a resource selection strategy, wherein the LTE system and the narrow band orthogonal frequency division multiplexing system share bandwidth; and
a transmission block, configured to transmit a narrow band orthogonal frequency division multiplexing signal on the determined spectrum resource of the narrow band orthogonal frequency division multiplexing system,
wherein the LTE system bandwidth includes $N_{BW}$ available subcarriers, the narrow band orthogonal frequency division multiplexing system bandwidth includes $M_{BW}$ subcarriers, and a physical resource block (PRB) index, which corresponds to a center subcarrier of the $M_{BW}$ subcarriers in the narrow band orthogonal frequency division multiplexing system located in the LTE system bandwidth is $I_{PRB}$, and
wherein $N_{BW}$ mod 24=12 and $I_{PRB}$ mod 5=2.

10. The device of claim 9, wherein the setup of the transmission block is to transmit the narrow band orthogonal frequency division multiplexing signal on the determined spectrum resource of the narrow band orthogonal frequency division multiplexing system through the following manners: transmitting a synchronization signal through one or more subcarriers in the determined narrow band orthogonal frequency division multiplexing system, wherein in different Orthogonal Frequency Division Multiplexing (OFDM) symbols, the synchronization signal occupies different subcarriers.

11. The device of claim 10, wherein the synchronization signal carries at least one of the following information:
cell identity information of the narrow band orthogonal frequency division multiplexing system; and
frequency domain position information of the narrow band orthogonal frequency division multiplexing system in the LTE system.

12. The device of claim 11, wherein the frequency domain position information is indicated through a signaling carried in the physical broadcast channel.

13. The device of claim 10, wherein the synchronization signal comprises at least one of a primary synchronization signal and a secondary synchronization signal.

14. The device of claim 9, wherein the setup of the transmission block is to transmit a narrow band orthogonal frequency division multiplexing signal through the determined spectrum resource of the narrow band orthogonal frequency division multiplexing system through the follow manner: transmitting a reference signal through one or more subcarriers in the determined narrow band orthogonal frequency division multiplexing system.

15. The device of claim 14, wherein the transmitted reference signal comprise: the same reference signal as the cell-specific reference signal corresponding with $M_{BW}$ subcarriers transmission in the LTE system, wherein the $M_{BW}$ is the subcarrier number included in the narrow band orthogonal frequency division multiplexing system.

16. A method for receiving a narrow band orthogonal frequency division multiplexing signal, the method comprising:
receiving a narrow band orthogonal frequency division multiplexing signal on a spectrum resource of the narrow band orthogonal frequency division multiplexing system that shares a bandwidth with a LTE system,
wherein the LTE system bandwidth includes $N_{BW}$ available subcarriers, the narrow band orthogonal frequency division multiplexing system bandwidth includes $M_{BW}$ subcarriers, and an index of a physical resource block (PRB), which corresponds to a center subcarrier of the $M_{BW}$ subcarriers of the narrow band orthogonal frequency division multiplexing system, in the LTE system bandwidth is $I_{PRB}$; and
wherein $N_{BW}$ mod 24=12 and $I_{PRB}$ mod 5=2.

17. The method of claim 16, wherein receiving the narrow band orthogonal frequency division multiplexing signal on the determined spectrum resource of the narrow band orthogonal frequency division multiplexing system comprises:
receiving a synchronization signal on one or more subcarriers of the determined narrow band orthogonal frequency division multiplexing system, wherein, the synchronization signal occupies different subcarriers in different Orthogonal Frequency Division Multiplexing (OFDM) symbols.

18. The method of claim 17, wherein the synchronization signal carries at least one of the following information:
cell identity of the narrow band orthogonal frequency division multiplexing system;
frequency domain position of the narrow band orthogonal frequency division multiplexing system in the LTE system.

19. The method of claim 18, wherein the frequency domain position is indicated by a signaling carried in a physical broadcast channel.

20. The method of claim 17, wherein the synchronization signal comprises at least one of a primary synchronization signal and a secondary synchronization signal.

21. The method of claim 16, wherein receiving the narrow band orthogonal frequency division multiplexing signals on the determined spectrum resource of the narrow band orthogonal frequency division multiplexing system comprises: receiving a reference signal on one or more subcarriers in the determined narrow band orthogonal frequency division multiplexing system.

22. The method of claim 21, wherein the received reference signal comprises: a reference signal same as the cell-specific reference signal transmitted over the corresponding $M_{BW}$ subcarriers in the LTE system, wherein the $M_{BW}$ is the number of subcarriers included in the narrow band orthogonal frequency division multiplexing system.

23. The method of claim 21, wherein the transmitted reference signal is determined based on a configured cell identity.

24. A non-transitory computer-readable medium having stored thereon computer-executable instructions for carrying out any one of claims 1 through 8 or 16 through 23.

* * * * *